(No Model.)  2 Sheets—Sheet 1.
J. GANNETT.
COMBINED CORN PLANTER AND CHECK ROWER.

No. 323,505. Patented Aug. 4, 1885.

WITNESSES
W. W. Mortimer
E. G. Siggers

Jasper Gannett
INVENTOR by C. A. Snow & Co.
Attorneys (No Model.) 2 Sheets—Sheet 2.

J. GANNETT.
COMBINED CORN PLANTER AND CHECK ROWER.

No. 323,505. Patented Aug. 4, 1885.

WITNESSES
W. N. Mortimer
E. G. Siggers

Jasper Gannett
INVENTOR
by C. A. Snow & Co.
Attorneys

UNITED STATES PATENT OFFICE.

JASPER GANNETT, OF RUTHVEN, IOWA.

COMBINED CORN-PLANTER AND CHECK-ROWER.

SPECIFICATION forming part of Letters Patent No. 323,505, dated August 4, 1885.

Application filed November 13, 1884. (No model.)

*To all whom it may concern:*

Be it known that I, JASPER GANNETT, a citizen of the United States, residing at Ruthven, in the county of Palo Alto and State of Iowa, have invented a new and useful Improvement in Combined Corn-Planter and Check-Rower, of which the following is a specification, reference being had to the accompanying drawings.

My invention has relation to a combined corn-planter and check-rower; and it consists in the construction and novel arrangement of parts, as will be hereinafter fully described, and particularly pointed out in the claims.

Figure 1:
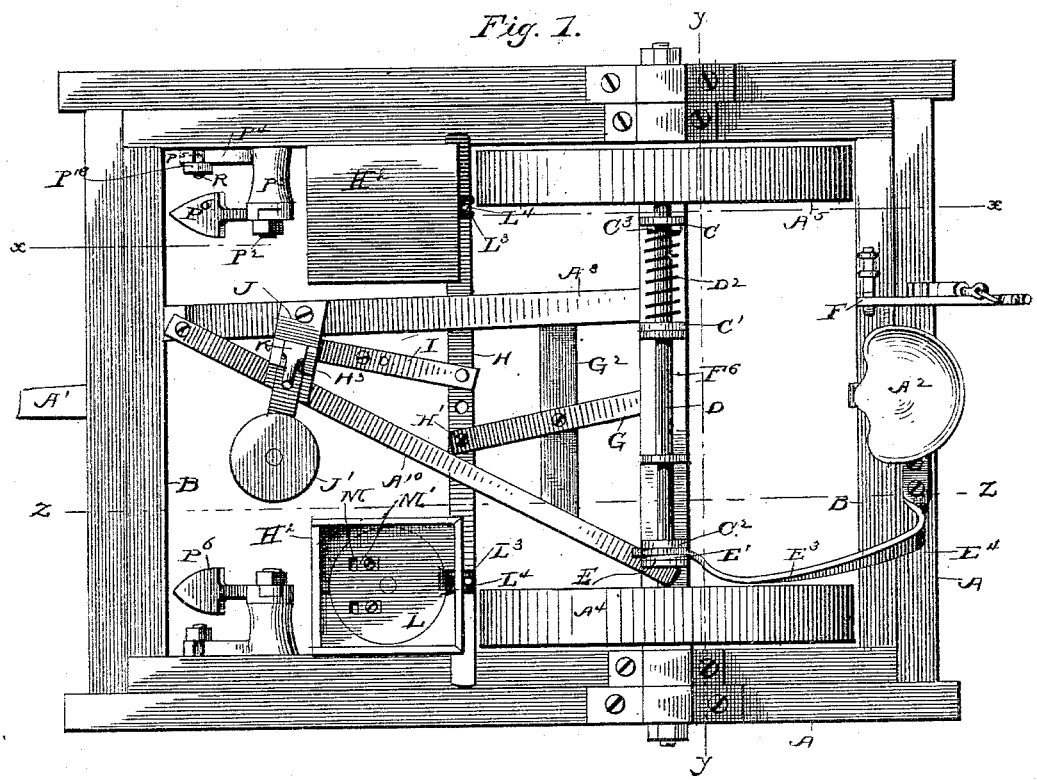
Figure 2:
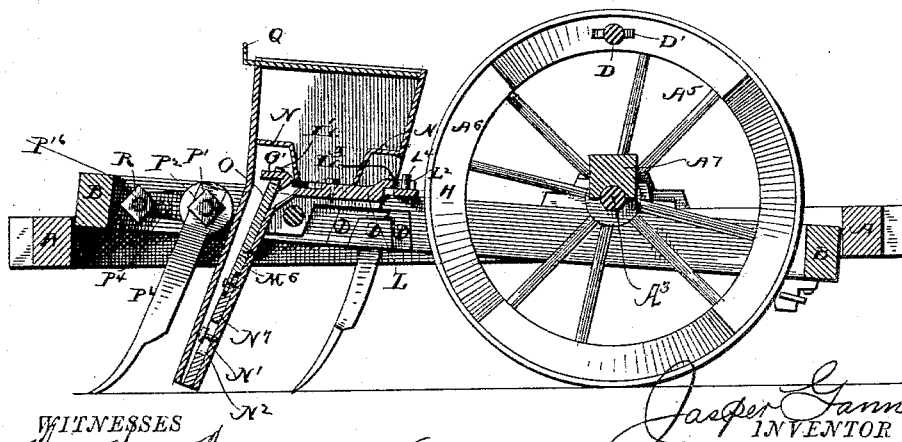
Figure 3:
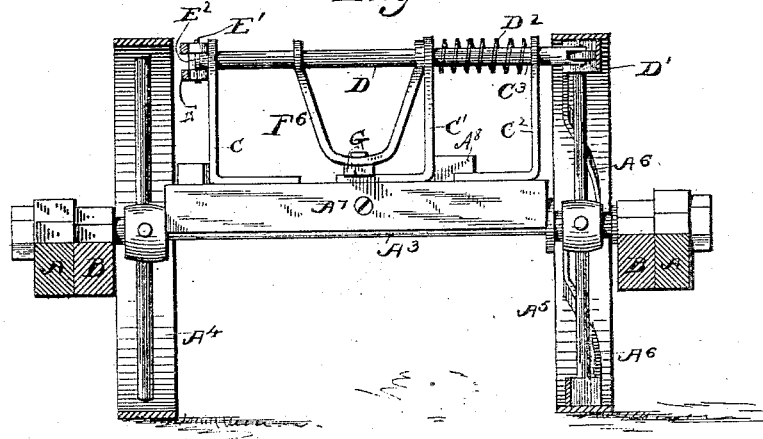
Figure 4:
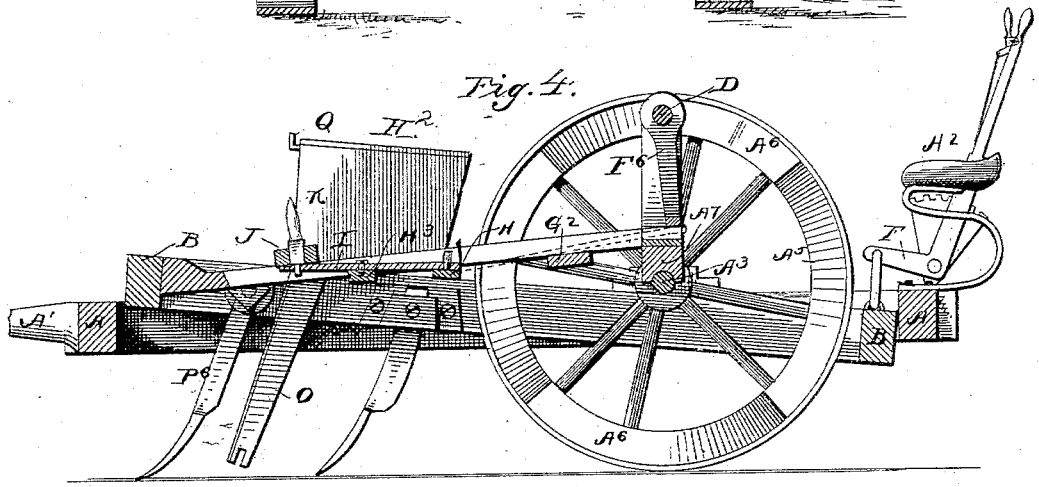
Figures 5, 7:
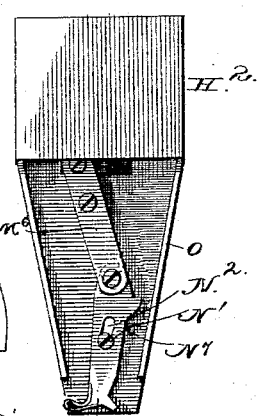
Figure 6:
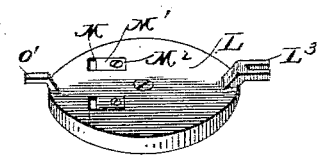

In the drawings, Figure 1 is a plan view of a combined implement embodying my improvements. Fig. 2 is a vertical longitudinal section on the line $x\,x$ in Fig. 1. Fig. 3 is a transverse vertical section on the line $y\,y$ in Fig. 1. Fig. 4 is a vertical longitudinal section on the line $z\,z$ in Fig. 1. Fig. 5 is a sectional detail view of the dropping-lever in the seed-spout. Fig. 6 is a detail view of one of the dropping-disks with its adjustable seed-cups. Fig. 7 is a detailed perspective view of the slotted arm $E^3$.

Referring by letter to the accompanying drawings, A designates the outer or main frame, to which the pole A' and driver's seat $A^2$ are attached, and B designates the auxiliary inner frame, which carries the opening, dropping, and covering mechanisms. These frames A and B are mounted on a single axle, $A^3$, supported by two wheels, $A^4$ and $A^5$, the latter being the drive-wheel. The drive-wheel $A^5$ is provided with a serpentine cam, $A^6$, which is cast with the wheel $A^5$ on its spokes between the hub and the felly of the wheel $A^5$. The supporting and driving wheels are on the inside of the inner frame, B, and between the wheels on the axle is a timber, $A^7$, which is grooved longitudinally in its under face to receive the metal axle $A^3$, to which it is secured by a bolt or bolts to hold it firmly in place. From the timber $A^7$, a longitudinal bar, $A^8$, extends forward to the front bar of the inner frame, B. From the right end of timber $A^7$ an inclined bar, $A^{10}$, extends forward and is connected to the forward end of the longitudinal bar $A^8$. Upon the timber $A^7$, between the wheels $A^4$ and $A^5$, are secured three vertical standards, C C' $C^2$, which form the bearings for the side rod, D, by which the seed-dropping mechanism is operated when the slide-rod D is in gear with the cam-wheel $A^5$. That end of the slide-rod D that comes in contact with the serpentine cam $A^6$ is bifurcated, and provided in said bifurcation with a friction-roller, D', to lessen the friction and prevent wear of the parts when in contact. The slide-rod D on that portion of it lying between the two standards C' and $C^2$ is encircled by a coil-spring, $D^2$, one end of which bears against the standard C', and the other end of said spring bears against a cross-pin, $C^3$, passed through said slide-rod. The spring $D^2$ operates to normally hold the friction-roller D' in engagement with the serpentine cam $A^6$.

$E^3$ represents a curved arm, which is secured to the rail $E^4$ of the outer frame, and extends upwardly and forwardly therefrom, as shown. This arm is bent obliquely at its front end, and is slotted for the passage of the left end of the slide-rod D. A washer, E', is placed on the rod and the outer side of the arm, and on the end of the rod is secured a nut, E, that prevents the washer from slipping off the rod.

The slide-rod D has an inverted bail-arm, $F^6$, rigidly secured thereto between the standards C C', and to the lower end of this bail $F^6$ the rear end of a lever, G, is pivoted. The lever G is fulcrumed upon a transverse bar, $G^2$, in front of the axle, and to the forward end of this lever G the transverse feed-slide H is connected by a pivot-stud, H'. The feed-slide H extends entirely across the auxiliary frame, immediately in rear of the seed-boxes $H^2$, and is also connected to the rear end of a lever, I, fulcrumed upon a transverse bar, $H^3$, secured to the under faces of the bars $A^8\,A^{10}$. Upon the bars $A^8\,A^{10}$ is secured a vertically-recessed bar or block, J, to which a seat, J', is secured for the person who is to operate the machine by a hand-lever, K, fulcrumed in the block J, and having a pin in its lower end which engages the forward end of lever I. This lever is only used when the cam is disengaged from the slide-rod. This lever may also be operated by the ordinary check-rope when desired.

The feed-disks L are pivoted in the bottoms of the seed-hoppers H² H², and are connected by short bifurcated-arms L³ to studs or pins L⁴ on the feed-slide. These disks L are provided with open-bottom seed-cups M, having adjustable slides M' secured in them by set-screws M², whereby the quantity of corn to be discharged into the furrow may be regulated. Guards N are provided in the seed-hoppers to prevent a continuous discharge of the seed, and the seed-disks L are oscillated by the gearing and other mechanism, and carry the cups under the guards and drop the seed into the discharge-chutes O. A short arm, O', at the front of the seed-disk L, enters a hole, L', in the upper end of a lever, M⁶, in the chute O. This lever M⁶ is fulcrumed at its middle near the upper end of the discharge-chute. To the lower end of the lever M⁶ a shorter slotted lever, N⁷, is pivoted, and a screw, N', is passed through the slot N² into the rear wall of the chute O. The lever N⁷ is provided on its lower end with a foot or shoe, P, which curves upwardly and outwardly at one side and downwardly and outwardly at the other side, and serves to distribute the seed. The hoppers are provided with slide-covers Q.

In front of each discharge-chute O, I provide an opening-plow, P⁶, the upper end of the shank of which plow is provided with a hole, P', which permits it to be slipped to place on its securing-bolt P². On the bolt P² I provide a sleeve, P³, having an arm, P⁴, with a recess, P⁵, opening upward near its forward end. In its inner end the sleeve P³, is provided with a rectangular groove, in which the upper end of the plow-shank is seated, and is held by a nut on the securing-bolt P². A second bolt, R, passes through the open recess P⁵, and a nut, P¹⁶, binds the arm P⁴ tightly enough to hold the plow to its work under ordinary circumstances, but will permit it to yield to an obstruction that would break it under ordinary circumstances. The discharge-chutes are secured on bolts, and will also yield when the plows are carried back against them when an obstruction is met, so that neither the plows nor the discharge-chutes are likely to be broken. At their forward ends the main and auxiliary frames may be connected by short chains (not necessary to be shown here) to limit the adjustments of the main and auxiliary frames. At its rear end the auxiliary frame is provided with scrapers, (see Fig. 2,) which keep the wheels clean in adhesive soil.

Having thus fully described my invention, what I claim as new, and desire to secure by Letters Patent of the United States, is—

1. The combination, with the oscillating main and auxiliary frames, of the drive-wheels, one of which is provided with a cam, the spring-actuated slide-rod connecting with the dropping mechanism, and means, substantially as described, for depressing or operating the oscillating frames to throw the slide-rod out of operation, as set forth.

2. The combination, with the oscillating main and auxiliary frames, of the drive-wheels, the spring-actuated slide-rod connecting with the dropping mechanism and arranged to be operated by the movement of the wheels, and means, substantially as described, for depressing the oscillating frames to throw the slide-rod out of operation, as set forth.

3. The combination, with the oscillating main and auxiliary frames, of the drive-wheels mounted in the main frame, a cam provided on one of the wheels, a spring-actuated slide-rod connecting with the dropping mechanism and journaled in the auxiliary frame, and means, substantially as described, for depressing the latter to throw the slide-rod out of operation with the cam, as set forth.

4. The combination, with the oscillating main and auxiliary frames, of the drive-wheels mounted in the main frame, a cam provided on one of the wheels, a spring-actuated slide-rod connecting with the dropping mechanism and mounted in the auxiliary frame, a roller on one end of the rod, and means, substantially as described, for depressing the auxiliary frame to cause the slide-rod to be thrown out of operation, as set forth.

5. The combination, with the main frame and drive-wheels, one of which is provided with a cam, of the spring-actuated slide-rod D, working through suitable standards projecting upward from the frame in rear of the seed-boxes and bearing at one end upon the cam, an arm, F⁶, connecting with the rod, the lever G, attached to the arm, and the feed-slide H, fitted to the lever and connected with the seed-disks, as set forth.

6. The combination, with the seed-hopper having the oscillating seed-disk and depending discharge-chute, of a shoe or foot arranged transversely across the lower or open end of the chute and having lateral points or projections, said shoe having a vertical and a lateral movement to distribute the seed, as set forth.

7. The combination, with the seed-hopper having the oscillating seed-disk and the discharge-chute, of the slotted lever N, provided with a shoe, P, at its lower end to close the open end or bottom of the chute, and a lever connecting the lever N with the seed-disk, said lever N having a vertical as well as a lateral movement and imparting a corresponding movement to the shoe, for the purpose set forth.

In testimony that I claim the foregoing as my own I have hereto affixed my signature in presence of two witnesses.

JASPER GANNETT.

Witnesses:
EDWARD ANDERSON,
LEWIS I. CHRISTENSON.